(12) United States Patent
Lin et al.

(10) Patent No.: US 7,443,352 B1
(45) Date of Patent: Oct. 28, 2008

(54) MULTI-BAND ANTENNA

(75) Inventors: Ching-Chi Lin, Taipei Hsien (TW); Jia-Hung Su, Taipei Hsien (TW); Kai Shih, Taipei Hsien (TW); Yu-Yuan Wu, Taipei Hsien (TW)

(73) Assignee: Cheng Uei Precision Industry Co., Ltd., Taipei Hsien (TW)

( * ) Notice: Subject to any disclaimer, the term of this patent is extended or adjusted under 35 U.S.C. 154(b) by 0 days.

(21) Appl. No.: 11/833,800

(22) Filed: Aug. 3, 2007

(51) Int. Cl.
*H01Q 1/24* (2006.01)
(52) U.S. Cl. .................. 343/702; 343/702; 343/700
(58) Field of Classification Search .................. 343/702, 343/700 MS
See application file for complete search history.

(56) References Cited

U.S. PATENT DOCUMENTS

2004/0090377 A1* 5/2004 Dai et al. .............. 343/700 MS
2004/0227665 A1* 11/2004 Tai et al. ................ 343/700 MS
2006/0050007 A1* 3/2006 Min ........................... 343/876

* cited by examiner

*Primary Examiner*—Douglas W. Owens
*Assistant Examiner*—Dieu Hien T Duong
(74) *Attorney, Agent, or Firm*—WPAT, P.C.; Anthony King

(57) ABSTRACT

The present invention discloses a multi-band antenna, the multi-band antenna has an antenna base, a power feed portion and a grounding point. The antenna base includes a first rectangular portion, a second rectangular portion and a third rectangular portion. A first connection portion connects the first rectangular portion with the second rectangular portion, a second connection portion connects the first extending portion with the second extending portion. The power feed portion is arranged below the antenna base, and the power feed portion connects to the first rectangular portion and the second rectangular portion. The grounding point is arranged below the first rectangular portion and near the power feed portion. The first and second connection portions control the size of the electric current through the antenna base. By the above-mention unique design, the multi-band antenna can receive and transmit the signals of the different frequency bands and has a smaller volume.

5 Claims, 2 Drawing Sheets

MULTI-BAND ANTENNA

BACKGROUND OF THE INVENTION

1. Field of the Invention

The present invention relates to an antenna, more particularly, to a multi-band antenna which can be installed at the inner side of a notebook computer or else electronic products.

2. The Related Art

With the high-speed development of mobile communication technology and popularization of the electronic product, people hope more and more that notebook computer or other electronic products can receive and transmit the signals of different frequency bands. Electronic product having a dual-band antenna or a tri-band antenna is widely used in recent years. The antenna as a portion to receive and transmit a radio signal is used in communication products, the parameter measuring the performance of an antenna includes operation frequency, radiation pattern, reflected loss and antenna gain, etc.

Known antennas include the planar Inverted-F antenna, the monopole antenna and the loop antenna. Above-mentioned antennas are unable to use in different frequency bands, but the frequency bands used in the communication field include GSM850, EGSM, DCS1800, PCS1900, W-CDMA2100, etc. In some electronic products, different antennas from the above-mention antennas are combined in an electronic product to receive and transmit different band signals, but the antenna gain of the combined antennas will be reduced, because the signals produced by the corresponding antennas will interfere each other. And the combined antennas will occupy a large space in the electronic product. In addition, as the volume of the electronic product reduces, an antenna receiving and transmitting different band signals and having a smaller volume is more and more urgently needed.

SUMMARY OF THE INVENTION

The main purpose of the present invent is offering a multi-band antenna which can solve the above-mentioned blemishes.

The multi-band antenna has an antenna base, a power feed portion and a ground point. The antenna base has a first rectangular portion extending from left to right, a second rectangular portion extending from left to right and spaced from the right end of the first rectangular portion and a third rectangular portion extending from left to right and spaced from the right end of the second rectangular portion. A first connection portion is arranged between the first rectangular portion and the second rectangular portion, and connects the first rectangular portion with the second rectangular portion. A second connection portion is arranged between the second rectangular portion and the third rectangular portion, and the second connecting portion connects the second rectangular portion with the third rectangular portion. The power feed portion is below the antenna base, one end of the power feed portion connects to the first rectangular portion, and the other end of the power feed portion connects to the second rectangular portion. The grounding point below the first rectangular point is arranged near the power feed portion.

When the electric current passes through the first rectangular portion, the second rectangular portion, the third rectangular portion, the first connection portion and the second connection portion, the first and second connection portions can control the size of the electric current, thus the multi-band antenna can receive and transmit different frequency band signals. In addition, with the unique design of the present invention, the multi-band antenna 10 has a smaller volume.

BRIEF DESCRIPTION OF THE DRAWINGS

The accompanying drawings, which are included to provide a further understanding of the invention and are incorporated in and constitute a part of this specification, illustrate an embodiment of the invention and together with the description serve to explain the principles of the invention. In the drawings.

DETAILED DESCRIPTION OF THE PREFERRED EMBODIMENT

Reference will now be made in detail to the preferred embodiment of the present invention, examples of which are illustrated in the accompanying drawings.

Figure 1:
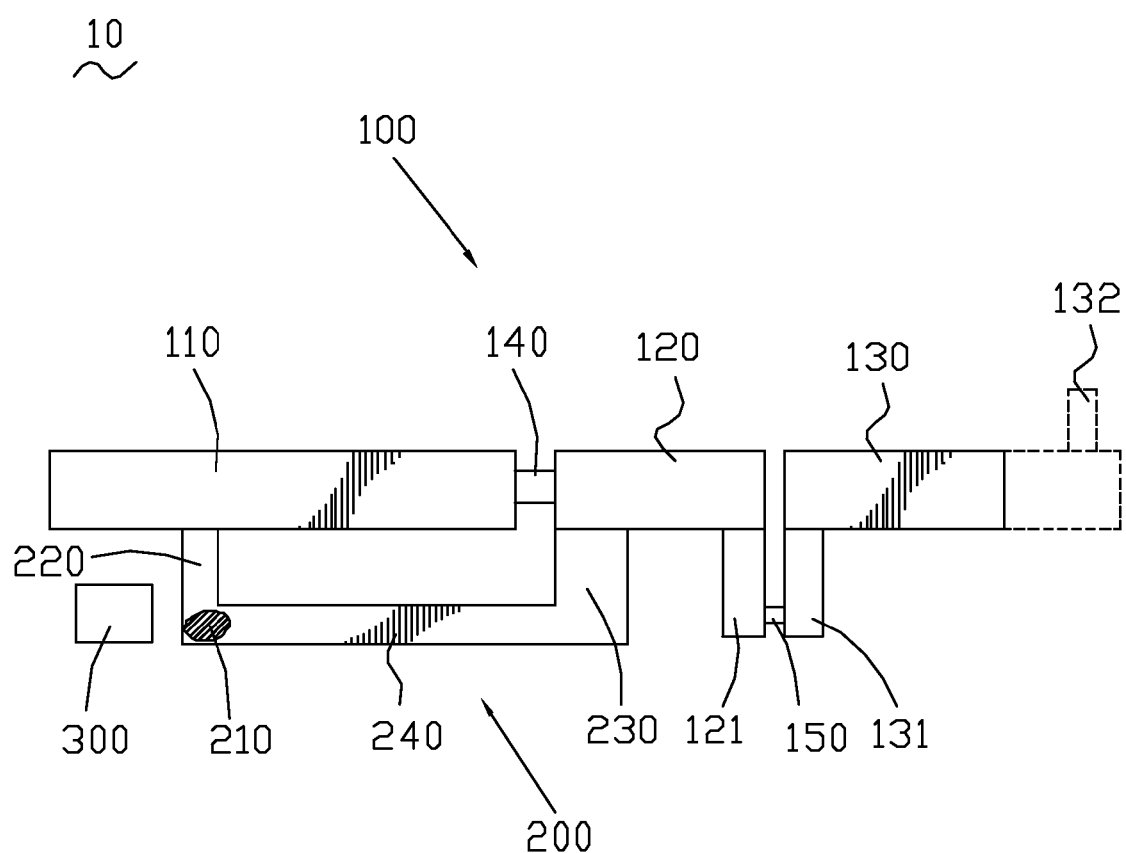
FIG. 1 is a plan view showing a multi-band antenna in accordance with the present invention.

Please refer to FIG. 1, a multi-band antenna 10 of the present invention is made of metal material, for example, the multi-band antenna 10 can be made by punching a metal board or etching foil in a PCB. The multi-band antenna 10 includes an antenna base 100, a power feed portion 200 and a grounding point 300 both below the antenna base 100.

The antenna base 100 includes a first rectangular portion 110 extending from left to right, a second rectangular portion 120 extending from left to right and spaced from the right end of the first rectangular portion 110, and a third rectangular portion 130 extending from left to right and spaced from the right end of the second rectangular portion 120. The first rectangular portion 110, the second rectangular portion 120 and the third rectangular portion 130 are metal slices, the three rectangular portions are used for conducting the electric current. A first connection portion 140 is arranged between the first rectangular portion 110 and the second rectangular portion 120 for connecting the two rectangular portions 110, 120. The first connection portion 140 is a capacitor or an inductance. The right end of the second rectangular portion 120 extends downward to form a first extending portion 121, the first extending portion 121 shows a rectangular board shape. The left end of the third rectangular portion 130 extends downward to form a second extending portion 131, the second extending portion 131 shows a rectangular board shape. A second connection portion 150 connects the lower end of the first extending portion 121 with the lower end of the second extending portion 131. The second connection portion 150 is a capacitor or an inductance. A third extending portion 132 extends upward from a right portion of the third rectangular portion 130.

The power feed portion 200 includes a first feed strip 220, a second feed strip 230 and a third feed strip 240. The first feed strip 220 perpendicularly connects to the left side of the first rectangular portion 110. The second feed strip 230 perpendicularly connects to the left side of the second rectangular portion 120. The two ends of the third feed strip 240 connect the lower ends of the first rectangular portion 110 and the second rectangular portion 120. The third feed strip 240 parallels the first rectangular portion 110. And the width of the second feed strip 230 is more than the width of the first feed strip 220. A power feed point 210 is set at a corner of the first and third feed strips 220, 240. A grounding point 300 near the power feed point 210 is arranged below the first rectangular portion 110.

Figure 2:
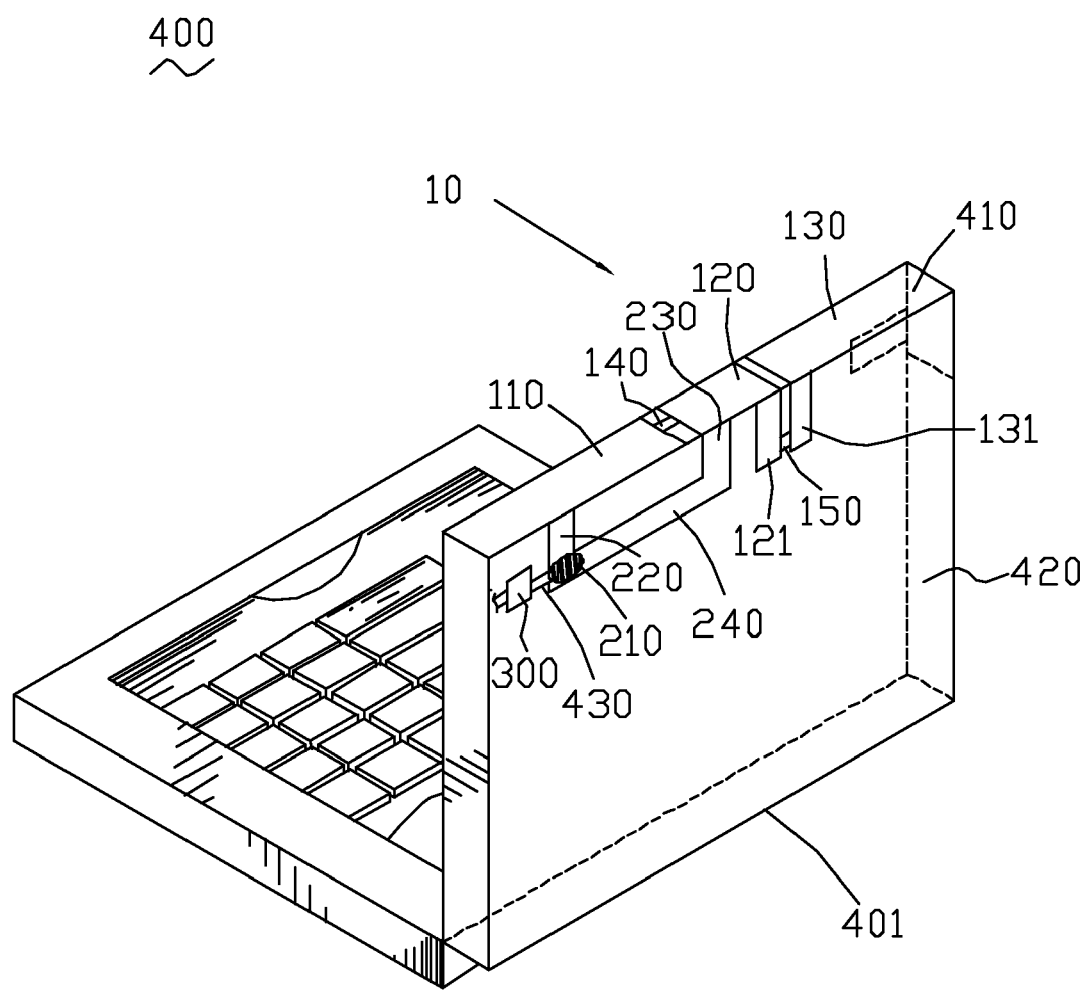
FIG. 2 is a perspective view showing a notebook computer with the multi-band antenna.

Referring to FIG. 2, the multi-band antenna 10 is installed at the inner side of a display device 401 of the notebook computer 400. The antenna base 100 is located on a top surface 410 of the display device 401. The first extending portion 121 and the second extending portion 131 are bent and fixed on a back surface 420 of the display device 410. The right portion of the third rectangular portion 130 is bent and fixed on a side surface of the displayer device 410. The third extending portion 132 is bent and fixed on a front surface of the display device 410 facing to the back surface 420. A conduction wire 430 connects the grounding point 300 with the power feed point 210. The grounding point 300 is arranged in the back surface 420 and electrically connects a metal cover of the notebook computer 400 (not shown). So the notebook computer 400 can receive and transmit signal by the multi-band antenna 10.

When the multi-band antenna 10 is used to receive or transmit signal, the electric current circulates in the first rectangular portion 110, the second rectangular portion 120, the third rectangular portion 130, the first connection portion 140 and the second connection portion 150. The first and second connection portions 140, 150 can control the size of the electric current, therefore, the multi-band antenna 10 can perform in different band signals. For example, when the electric current passes through the power feed point 210, the first feed strip 220 and the first rectangular portion 110, the multi-band antenna 10 can receive and transmit the band signals around 1800 MHz and 1900 MHz; when the electric current passes through the power feed point 210, the third feed strip 240, the second feed strip 230 and the second rectangular portion 120, the multi-band antenna 10 can receive and transmit the band signals around the 2100 MHz; when the electric current passes through the entire multi-band antenna 10, the multi-band antenna 10 can receive and transmit the band signal around 850 MHz and 900 MHz. With the unique design of the present invention, the multi-band antenna 10 can receive and transmit the different band signals and has a smaller volume.

As the present invention may be embodied in several forms without departing from the spirit or essential characteristics thereof, it should also be understood that the above-described embodiment are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A multi-band antenna, comprising:
   an antenna base having a first rectangular portion extending from left to right, a second rectangular portion extending from left to right and spaced from the right end of the first rectangular portion, and a third rectangular portion extending from left to right and spaced from the right end of the second rectangular portion, the right end of the second rectangular portion extending downward to form a first extending portion, the left end of the third rectangular portion extending downward to form a second extending portion, a first connection portion connecting the first rectangular portion with the second rectangular portion, a second connection portion connecting the first extending portion with the second extending portion;
   a power feed portion arranged below the antenna base, the power feed portion connected to the first rectangular portion and the second rectangular portion; and
   a grounding point arranged below the first rectangular portion and near the power feed portion.

2. The multi-band antenna according to claim 1, further comprising a third extending portion extending upward from a right portion of the third rectangular portion.

3. The multi-band antenna according to claim 1, wherein the power feed portion includes a first feed strip, a second feed strip and a third feed strip, the first feed strip perpendicularly connects to the left side of the first rectangular portion, the second feed strip perpendicularly connects to the left side of the second rectangular portion, the two ends of the third feed strip connect the lower ends of the first rectangular portion and the second rectangular portion, a power feed point is set at a corner of the first and third feed strips.

4. The multi-band antenna according to claim 1, wherein the second feed strip is wider than the first feed strip.

5. The multi-band antenna according to claim 1, wherein the first and second connection portions are capacitors or inductances.

* * * * *